US007517302B2

(12) United States Patent
Kobayashi et al.

(10) Patent No.: US 7,517,302 B2
(45) Date of Patent: Apr. 14, 2009

(54) FAIL CONTROL APPARATUS FOR AUTOMATIC TRANSMISSION

(75) Inventors: Hiroyuki Kobayashi, Fuji (JP);
Hirofumi Michioka, Fuji (JP); Hajime Tasaka, Fuji (JP)

(73) Assignee: Jatco Ltd (JP)

( * ) Notice: Subject to any disclaimer, the term of this patent is extended or adjusted under 35 U.S.C. 154(b) by 384 days.

(21) Appl. No.: 11/531,820

(22) Filed: Sep. 14, 2006

(65) Prior Publication Data
US 2007/0066445 A1 Mar. 22, 2007

(30) Foreign Application Priority Data
Sep. 22, 2005 (JP) ............... 2005-275524

(51) Int. Cl.
*F16H 61/18* (2006.01)
(52) U.S. Cl. ...................... 477/125; 477/906
(58) Field of Classification Search ................ 477/115, 477/121, 125, 906
See application file for complete search history.

(56) References Cited
U.S. PATENT DOCUMENTS

| 4,685,051 | A | * | 8/1987 | Hattori et al. ................. 701/63 |
| 5,216,938 | A | * | 6/1993 | Yamaguchi ................. 477/107 |
| 5,947,867 | A | | 9/1999 | Gierer et al. |
| 6,398,684 | B1 | * | 6/2002 | Kaizu .......................... 475/127 |
| 6,459,979 | B2 | * | 10/2002 | Murakami .................... 701/54 |
| 6,962,552 | B2 | * | 11/2005 | Sakamoto et al. ........... 477/155 |
| 7,402,123 | B2 | * | 7/2008 | Kobayashi et al. ........... 477/75 |
| 2006/0270515 | A1 | | 11/2006 | Kobayashi et al. |

FOREIGN PATENT DOCUMENTS

| EP | 1 729 038 A2 | 6/2006 |
| JP | 2000-240785 A | 9/2000 |
| JP | 2003-269602 A | 9/2003 |
| JP | 2008069908 A | * 3/2008 |

OTHER PUBLICATIONS

Relevant portion of Extended European Search Report issued for corresponding European Patent Application No. 06254664.3-2421, with mailing date Feb. 2, 2007.

* cited by examiner

*Primary Examiner*—Ha D. Ho
(74) *Attorney, Agent, or Firm*—Rossi, Kimms & McDowell, LLP

(57) ABSTRACT

There is provided a fail control apparatus for an automatic transmission, which, in the event of a friction element failure, is capable of coping with the failure by identifying a failed part without erroneous determination and within a short time. The set gear ratio of a designated gear position at the time of failure and the actual gear ratio are compared with each other to determine whether a friction element has failed, and an alternative gear position which enables a vehicle to start moving again is designated based on the determination result. In determining a failed friction element, one friction element disengaged or engaged due to failure is identified only when the designated gear position is the first speed gear position which is achieved by engaging one low clutch and a one-way clutch. It is therefore possible to determine the details of failure with accuracy and properly set an alternative gear position.

10 Claims, 7 Drawing Sheets

Fig. 2

|  | LOW/C | 3-5R/C | H/C | L&R/B | 2-6/B | LOW/OWC |
|---|---|---|---|---|---|---|
| 1st | ○ |  |  | ⊗ |  | ● |
| 2nd | ○ |  |  |  | ○ |  |
| 3rd | ○ | ○ |  |  |  |  |
| 4th | ○ |  | ○ |  |  |  |
| 5th |  | ○ | ○ |  |  |  |
| 6th |  |  | ○ |  | ○ |  |
| Rev |  | ○ |  | ○ |  |  |

Fig. 5

| Designated gear position | | Patterns of failure likely to occure | | | | | Resulting gear position due to failure |
|---|---|---|---|---|---|---|---|
| | | LOW/C | 3-5R/C | H/C | L&R/B | 2-6/B | |
| 1st | | ◁ | × | × | × | × | N |
| | | ○ | ■ | × | × | × | 3 |
| | | ○ | × | ■ | × | × | 4 |
| | | ○ | × | × | × | ■ | 2 |
| 2nd | | ○ | × | × | × | ◁ | 1 |
| | | ◁ | × | × | × | ○ | N |
| 3rd | | ○ | ◁ | × | × | × | 1 |
| | | ◁ | ○ | × | × | × | N |
| 4th | | ○ | ◁ | ◁ | × | × | 1 |
| | | ◁ | × | ○ | × | × | N |
| 5th | | × | ◁ | ○ | × | × | N |
| | | × | ○ | ◁ | × | × | N |
| 6th | | × | × | ○ | × | ◁ | N |
| | | × | × | ◁ | × | ○ | N |

Fig. 7

| Designated gear position at the time of failure | Pattern of engaging instruction after vehicle stop | | | | | Alternative gear position |
|---|---|---|---|---|---|---|
| | LOW/C | 35R/C | H/C | L&R/C | 26/B | |
| 1st | × | ○ | ○ | × | × | 5 |
| 1st | LOW/C failure (disengagement): use other friction element | | | | | 2 or 3 or 4 |
| 1st | Other failure (engagement): maintain present state | | | | | |
| 2nd | × | ○ | ○ | × | × | 5 |
| 2nd | Use friction element not disengaged due to failure | | | | | |
| 3rd | × | × | ○ | × | ○ | 6 |
| 3rd | Use friction element not disengaged due to failure | | | | | |
| 4th | ○ | ○ | ○ | × | × | 3 or 5 |
| 4th | Use friction elements which would be interlocked if normal | | | | | |
| 5th | ○ | × | × | × | ○ | 2 |
| 5th | Use friction element not disengaged due to failure | | | | | |
| 6th | ○ | ○ | × | × | × | 3 |
| 6th | Use friction element not disengaged due to failure | | | | | |

FAIL CONTROL APPARATUS FOR AUTOMATIC TRANSMISSION

BACKGROUND OF THE INVENTION

1. Field of the Invention

The present invention relates to a fail control apparatus for a vehicular automatic transmission, and more particularly to a fail control apparatus which provides control in the event of a failure of a valve or the like which controls operating oil pressure applied to a friction element.

2. Description of the Prior

Conventionally, a control apparatus for a vehicular automatic transmission detects an electric failure of a solenoid, a sensor, or the like in a hydraulic control circuit and provides control to cope with the failure.

Examples of failures occurring in automatic transmissions, however, include not only the electric failure mentioned above but also a malfunction of a valve which controls operating oil pressure applied to a friction element when the valving element of the valve sticks or a foreign matter is caught in the valve.

If, due to such a valve malfunction, a friction element which should be engaged is disengaged or a friction element which should be disengaged remains engaged, a phenomenon such as shifting to a gear position different from a designated gear position or a neutral failure, i.e. shifting to neutral occurs, making it impossible for the vehicle to start moving again from a parked position.

The occurrence of such a failure can be detected with relative ease, but it is difficult to determine which friction element is concerned with the failure as distinct from the case of an electric failure.

To address this problem, it has been proposed in, for example, Japanese Laid-Open Patent Publication (Kokai) No. 2000-240785 that one friction element which has failed is identified by comparing the gear ratio of a designated gear position and the actual gear ratio, and control is carried out according to the failure of the identified friction element.

With this technique, when engagement caused by failure occurs, i.e. a friction element remains engaged although it should be disengaged, shifting to a gear position which is achieved by engaging the friction element engaged due to failure is carried out, and conversely, when disengagement caused by failure occurs, i.e. a friction element remains disengaged although it should be engaged, shifting to a gear position which is achieved without engaging the friction element disengaged due to failure is carried out.

According to the above conventional technique, however, a friction element which has failed is identified by comparing the gear ratio of a designated gear position and the actual gear ratio with respect to all the gear positions without exception during driving, and hence in actuality, there is the possibility of erroneous determination.

For example, in an automatic transmission described in Japanese Laid-Open Patent Publication (Kokai) No. 2000-240785, the second speed gear position is achieved by engaging a low clutch and a 2&4 brake among friction elements. In a case where a designated gear position at the time of failure determination is the second speed gear position, it is estimated that the low clutch is disengaged due to failure or the 2&4 brake is disengaged due to failure.

According to an engagement table of this automatic transmission, shifting to neutral (N) occurs when the low clutch is disengaged due to failure, and shifting to the first speed gear position occurs when the 2&4 brake is disengaged due to failure.

However, when either of these two failures occurs while the vehicle is moving at a high speed, the actual gear ratio cannot be determined since the speed of an engine cannot be accelerated to the first revolutionary speed corresponding to the first speed gear position. Also, depending on the driving conditions, engine torque may peak out at a gear ratio corresponding to the first speed gear position, and it may be erroneously determined that the 2&4 brake has been disengaged due to failure although in actuality, the low clutch has been disengaged due to failure.

Since determining the gear ratio and identifying a failed part take a lot of time, the above conventional technique is not effective for quickly coping with a failure.

SUMMARY OF THE INVENTION

It is therefore an object of the present invention to provide a fail control apparatus for an automatic transmission which is capable of quickly coping with a failure without the possibility of erroneous determination.

To attain the above object, there is provided a fail control apparatus for an automatic transmission which realizes a plurality of gear positions by engaging friction elements in combination, comprising: an actual gear ratio calculating means for calculating a present actual gear ratio; a fail determining means for comparing a set gear ratio of a present designated gear position and the actual gear ratio to determine whether a friction element has failed; and an abnormality control means responsive to occurrence of failure of a friction element, for designating a power transmissible gear position, wherein the fail determining means identifies one friction element having failed only when the designated gear position is a gear position that is achieved by engaging one friction element and a one-way clutch, and the abnormality control means designates a power transmissible gear position based on the identified friction element.

In the case where a friction element failure occurs when the vehicle is moving in a gear position which is achieved by engaging one friction element and the one-way clutch, it is uniquely determined that the one friction element is unengaged if power is not transmitted, and other friction element which should be unengaged is engaged if power is transmitted. In the state in which the one friction element and the other friction element are engaged, the actual gear ratio can be determined even if the one-way clutch is unengaged.

Thus, according to the present invention, only when a designated gear position at the time of failure is a gear position which is achieved by engaging one friction element and the one-way clutch, it is possible to identify one friction element which has failed. As a result, the details of failure can be determined with accuracy, and a power transmissible gear position can be set in an appropriate manner.

On the other hand, when a designated gear position at the time of failure is any gear position other than a gear position which is achieved by engaging one friction element and the one-way clutch one friction element which has failed is not identified, and all the friction elements which should be engaged in the designated gear position are regarded as failed ones. It is therefore possible to prevent erroneous determination and quickly set a power transmissible gear position.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram showing combinations of engaged/disengaged friction elements;

FIG. 5 is a diagram showing failure patterns;

FIG. 7 is a diagram showing patterns of engaging instructions given by fail control.

DETAILED DESCRIPTION OF THE PREFERRED EMBODIMENTS

The present invention will now be described in detail with reference to the drawings showing a preferred embodiment thereof.

Figure 1:
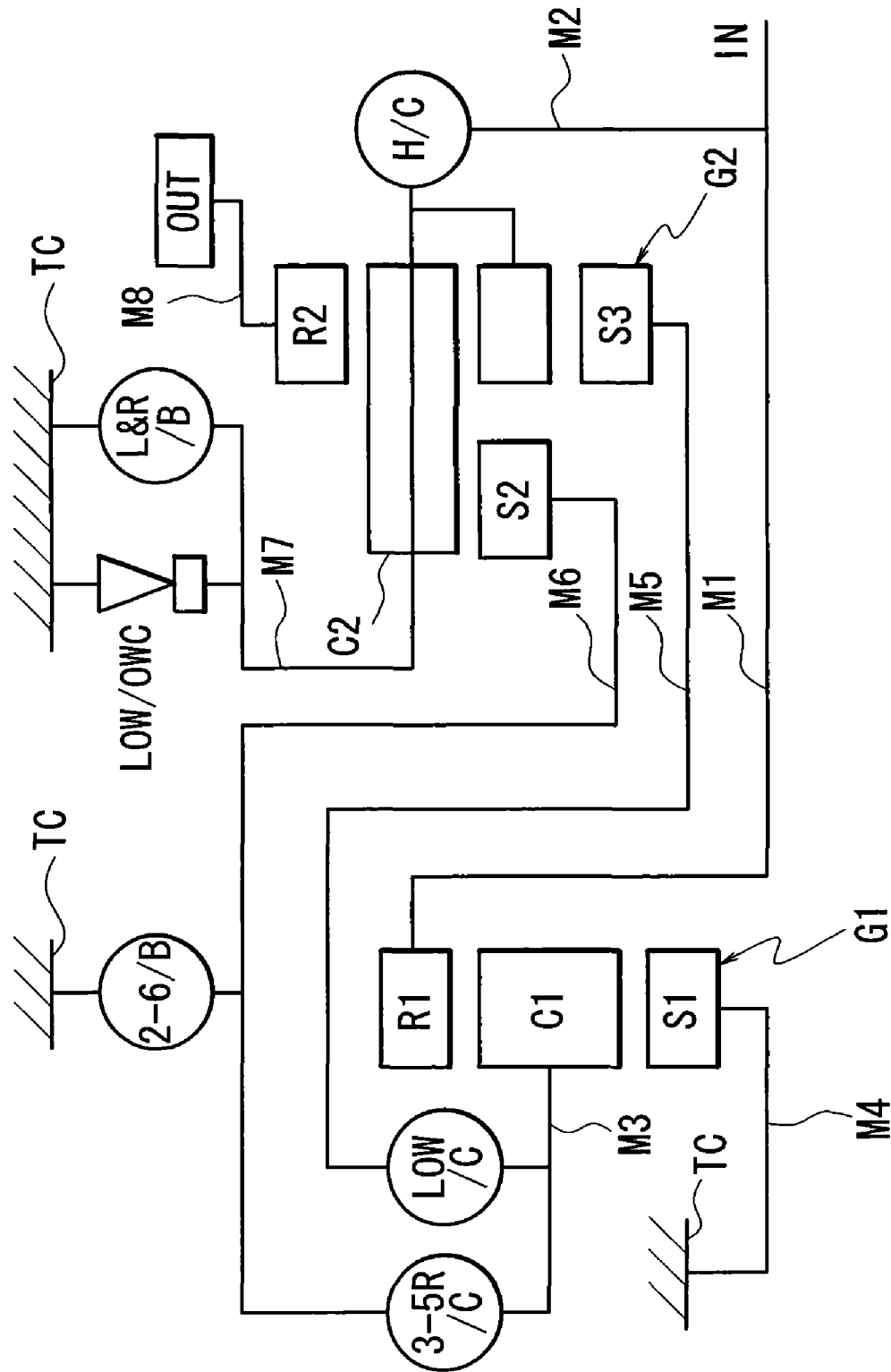
FIG. 1 is a skeleton diagram showing gear trains of an automatic transmission to which an embodiment of the present invention is applied.

FIG. 1 is a skeleton diagram showing gear trains of an automatic transmission to which an embodiment of the present invention is applied.

This automatic transmission is comprised of a simple planetary-gear set G1 and a Ravigneaus type planetary-gear set G2. The planetary-gear set G1 is comprised of a first sun gear S1, a first carrier C1, and a first ring gear R1. The planetary-gear set G2 is comprised of a second sun gear S2, a second carrier C2, a third sun gear S3, and a second ring gear R2.

An input shaft IN to which driving force is input from an engine via a torque converter, both of which are not shown, is connected directly to the first ring gear R1 via a first member M1. The input shaft IN is also connected directly to the second carrier C2 via a second member M2 and a high clutch H/C.

The first carrier C1 is connected to the third sun gear S3 via a third member M3, a low clutch LOW/C, and a fifth member M5. The first carrier C1 is also connected to the second sun gear S2 via the third member M3, a 3-5 reverse clutch 3-5R/C, and a sixth member M6. The sixth member M6 can be fixed to or released from a transmission case TC via a 2-6 brake 2-6/B.

The first sun gear S1 is fixed to the transmission case TC via a fourth member M4. The second carrier C2 is supported on the transmission case TC via a seventh member M7, and a low-and-reverse brake L&R/B and a low one-way clutch LOW/OWC, which are arranged in parallel with each other, such that the second carrier C2 may rotate in one direction and may be inhibited from being rotated (fixed) and allowed to be rotated from the rotation-inhibited state.

The second ring gear R2 is connected to an output gear OUT via an eighth member M8.

The automatic transmission constructed as described above realizes six forward speed gear positions (1st to 6th) and one reverse speed gear position (Rev) by engaging and disengaging friction elements in combination as shown in FIG. 2. In FIG. 2, the circular mark indicates that the concerned friction element is engaged, no mark indicates that the concerned friction element is disengaged, the circular mark with "x" indicates that the concerned friction element is engaged and operable at the time of engine braking, and the black-out circle indicates that the concerned friction element is mechanically engaged (inhibited from rotating) when the engine outputs a driving force.

In the D range, automatic gear shifting to the six forward speed gear positions is accomplished according to a shift schedule set based on the vehicle speed and the throttle opening angle. Also, gear shifting to the one reverse speed gear position is accomplished by switching a shift lever from the D range to the R range.

Here, the low-clutch LOW/C is engaged for all the first to third speed gear positions which are low speed gear positions among forward speed gear positions, and the high clutch H/C is engaged for all the fourth to sixth speed gear positions which are high speed gear positions.

Referring next to FIGS. 1 and 2, a description will be given of rotation transmission paths for respective speed gear positions.

The first speed gear position (1st) is achieved by engagement of the low clutch LOW/C and engagement of the low-and-reverse brake L&R/B or the low one-way clutch LOW/OWC.

The engine rotation from the input shaft IN is decelerated through the first member M1 and the planetary-gear set G1, and the decelerated rotation is input to the third sun gear S3 from the third member M3 through the low clutch LOW/C and the fifth member M5. In the planetary-gear set G2, the second ring gear R2, being subjected to reactive force from the second carrier C2 fixed to the transmission case TC by engagement of the low one-way clutch LOW/OWC, rotates while decelerating, and the decelerated rotation at the maximum reduction ratio is output from the output gear OUT through the eighth member M8. It should be noted that at the time of engine braking, the low-and-reverse brake L&R/B is subjected to the reactive force in place of the idling low one-way clutch LOW/OWC.

The second speed gear position (2nd) is achieved by engagement of the low clutch LOW/C and engagement of the 2-6 brake 2-6/B.

The rotation from the input shaft IN is decelerated through the first member M1 and the planetary-gear set G1, and the decelerated rotation is input to the third sun gear S3 from the third member M3 through the low clutch LOW/C and the fifth member M5. In the planetary-gear set G2, the second ring gear R2, being subjected to reactive force from the second sun gear S2 fixed to the transmission case TC by engagement of the 2-6 brake 2-6/B, rotates while decelerating, and the decelerated rotation at a smaller reduction ratio as compared with the first speed gear position is output from the output gear OUT through the eighth member M8.

The third speed gear position (3rd) is achieved by engagement of the low clutch LOW/C and engagement of the 3-5 reverse clutch 3-5R/C.

The rotation from the input shaft IN is decelerated through the first member M1 and the planetary-gear set G1, and the decelerated rotation is input to the third sun gear S3 from the third member M3 through the low clutch LOW/C and the fifth member M5. The rotation from the third member M3 is input to the second sun gear S2 as well through the 3-5 reverse clutch 3-5R/C and the sixth member M6.

As a result, the Ravigneaux type planetary-gear set G2 is brought into a directly-connected state, and hence the second ring gear R2 rotates at the same speed as the speed at which the sun gears S2 and S3 rotate, and the decelerated rotation at a smaller reduction ratio as compared with the second speed gear position is output from the output gear OUT through the eighth member M8.

The fourth speed gear position (4th) is achieved by engagement of the low clutch LOW/C and engagement of the high clutch H/C.

The rotation from the input shaft IN is decelerated through the first member M1 and the planetary-gear set G1, and the decelerated rotation is input to the third sun gear S3 from the third member M3 through the low clutch LOW/C and the fifth member M5.

Further, the same rotation as the rotation at the input shaft IN is input from the input shaft IN to the second carrier C2 through the second member M2 and the high clutch H/C.

In the planetary-gear set G2, the second ring gear R2 rotates at a speed intermediate between the two rotations input as above, and the rotation decelerated slightly as compared with the input rotation is output from the output gear OUT through the eighth member M8.

The fifth speed gear position (5th) is achieved by engagement of the 3-5 reverse clutch 3-5R/C and engagement of the high clutch H/C. The rotation from the input shaft IN is decelerated through the first member M1 and the planetary-gear set G1, and the decelerated rotation is input to the second sun gear S2 from the third member M3 through the 3-5 reverse clutch 3-5R/C and the sixth member M6.

Further, the same rotation as the rotation at the input shaft IN is input from the input shaft IN to the second carrier C2 through the second member M2 and the high clutch H/C.

In the planetary-gear set G2, the second ring gear R2 rotates while being restrained by the two rotations input as above, and the rotation accelerated slightly as compared with the input rotation is output from the output gear OUT through the eighth member M8.

The sixth speed gear position (6th) is achieved by engagement of the high clutch H/C and engagement of the 2-6 brake 2-6/B.

The same rotation as the rotation at the input shaft IN is input from the input shaft IN to only the second carrier C2 through the second member M2 and the high clutch H/C.

In the planetary-gear set G2, the second ring gear R2, being subjected to reactive force from the second sun gear S2 fixed to the transmission case TC by engagement of the 2-6 brake 2-6/B, rotates while accelerating, and the rotation accelerated as compared with the fifth speed gear position is output from the output gear OUT through the eighth member M8.

The reverse speed gear position (Rev) is achieved by engagement of the 3-5 reverse clutch 3-5 R/C and engagement of the low-and-reverse brake L&R/B.

The rotation from the input shaft IN is decelerated through the first member M1 and the planetary-gear set G1, and the decelerated rotation is input to the second sun gear S2 from the third member M3 through the 3-5 reverse clutch 3-5R/C and the sixth member M6.

The second ring gear R2, being subjected to reactive force from the second carrier C2 fixed to the transmission case TC by engagement of the low-and-reverse brake L&R/B, rotates in the reverse direction, and the decelerated reverse rotation is output from the output gear OUT through the eighth member M8.

Figure 3:
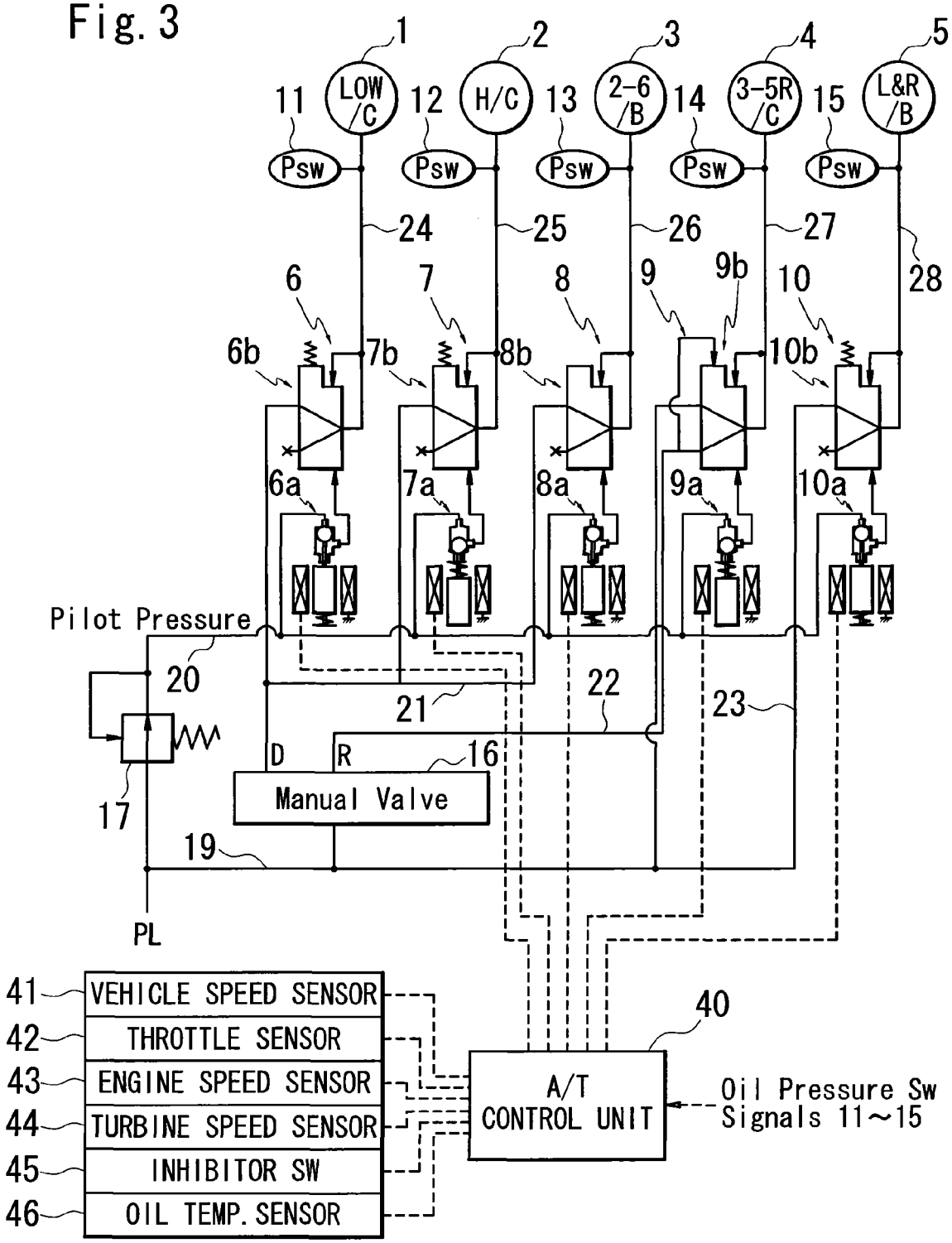
FIG. 3 is a diagram showing a hydraulic circuit and an electronic gearshift control system of the automatic transmission.

FIG. 3 is a diagram showing a hydraulic circuit and an electronic shift control system for carrying out shifting as described above.

The low-clutch LOW/C, the high clutch H/C, the 2-6 brake 2-6/B, the 3-5 reverse clutch 3-5R/C, and the low-and-reverse brake L&R/B are engaged by supplying engagement pressure which is D range pressure or R range pressure to engagement piston chambers 1 to 5 and disengaged by releasing the engagement pressure.

It should be noted that D range pressure is line pressure through a manual valve, described later, and is generated only when the D range is selected. The R range pressure is line pressure through the manual valve and is generated only when the R range is selected; when any other range is selected, no pressure is generated because of switching to a drain port, not shown.

The engagement pressure (low clutch pressure) to the engagement piston chamber 1 of the low clutch LOW/C is controlled by a first hydraulic control valve 6.

The engagement pressure (high clutch pressure) to the engagement piston chamber 2 of the high clutch H/C is controlled by a second hydraulic control valve 7.

The engagement pressure (2-6 brake pressure) to the engagement piston chamber 3 of the 2-6 brake 2-6/B is controlled by a third hydraulic control valve 8.

The engagement pressure (3-5 reverse clutch pressure) to the engagement piston chamber 4 of the 3-5 reverse clutch 3-5R/C is controlled by a fourth hydraulic control valve 9.

The engagement pressure (low-and-reverse brake pressure) to the engagement piston chamber 5 of the low-and-reverse brake L&R/B is controlled by a fifth hydraulic control valve 10.

The D range pressure from a manual valve 16 is supplied to the first to third hydraulic control valves 6 to 8 through a D range pressure oil passage 21. The line pressure PL is supplied to the manual valve 16 through a line pressure oil passage 19.

The line pressure PL is directly supplied to the fourth hydraulic control valve 9, and the R range pressure from the manual valve 16 is supplied to the fourth hydraulic control valve 9 through an R range pressure oil passage 22.

The line pressure PL is directly supplied to the fifth hydraulic control valve 10.

Pilot pressure obtained by regulating the line pressure PL with a pilot valve 17 is supplied to the hydraulic control valves 6 to 10 through a pilot pressure oil passage 20.

The first hydraulic control valve 6 is comprised of a first duty solenoid 6a that produces shift control pressure using pilot pressure as the original pressure and by solenoid force, and a first regulating valve 6b that regulates low clutch pressure using D range pressure as the original pressure and using shift control pressure and feedback pressure as actuating signal pressure.

The first duty solenoid 6a is controlled according to a duty ratio. Specifically, the first duty solenoid 6a controls the low clutch pressure to zero in the solenoid OFF state and increases the low clutch pressure in the solenoid-ON state as the ON duty ratio increases.

The second hydraulic control valve 7 is comprised of a second duty solenoid 7a that produces shift control pressure using pilot pressure as the original pressure and by solenoid force, and a second regulating valve 7b that regulates high clutch pressure using D range pressure as the original pressure and using shift control pressure and feedback pressure as actuating signal pressure.

The second duty solenoid 7a controls the high clutch pressure to zero in the solenoid-ON state (an ON duty ratio of 100%), increases the high clutch pressure as the ON duty ratio decreases, and controls the high clutch pressure to the maximum in the solenoid-OFF state.

The third hydraulic control valve 8 is comprised of a third duty solenoid 8a that produces shift control pressure using pilot pressure as the original pressure and by solenoid force, and a second regulating valve 8b that regulates 2-6 brake pressure using D range pressure as the original pressure and using shift control pressure and feedback pressure as actuating signal pressure.

The third duty solenoid 8a controls the 2-6 brake pressure to zero in the solenoid-OFF state and increases the 2-6 brake pressure in the solenoid-ON state as the ON duty ratio increases.

The fourth hydraulic control valve 9 is comprised of a fourth duty solenoid 9a that produces shift control pressure using pilot pressure as the original pressure and by solenoid force, and a fourth regulating valve 9b that regulates 3-5 reverse clutch pressure using line pressure as the original pressure and using shift control pressure and feedback pressure as actuating signal pressure when the D range is selected, and supplies line pressure as R range pressure directly to the 3-5 reverse clutch 3-5 R/C using R range pressure as actuating signal pressure when the R range is selected.

The fourth duty solenoid 9a controls the 3-5 reverse clutch pressure to zero in the solenoid-ON state (an ON duty ratio of 100%), increases the 3-5 reverse clutch pressure as the ON duty ratio decreases, and controls the 3-5 reverse clutch pressure to the maximum in the solenoid-OFF state.

The fifth hydraulic control valve 10 is comprised of a fifth duty solenoid 10a that produces shift control pressure using pilot pressure as the original pressure and by solenoid force, and a fifth regulating valve 10b that regulates low-and-reverse brake pressure using line pressure as the original pressure and using shift control pressure and feedback pressure as actuating signal pressure.

The fifth duty solenoid 10a controls the low-and-reverse brake pressure to zero in the solenoid-OFF state and increases the low-and-reverse brake pressure in the solenoid-ON state as the ON duty ratio increases.

A first oil pressure switch 11 is provided in a low clutch pressure oil passage 24 connecting the first hydraulic control valve 6 and the engagement piston chamber 1.

A second oil pressure switch 12 is provided in a high clutch pressure oil passage 25 connecting the second hydraulic control valve 7 and the engagement piston chamber 2.

A third oil pressure switch 13 is provided in a 2-6 brake pressure oil passage 26 connecting the third hydraulic control valve 8 and the engagement piston chamber 3.

A fourth oil pressure switch 14 is provided in a 3-5 reverse clutch pressure oil passage 27 connecting the fourth hydraulic control valve 9 and the engagement piston chamber 4.

A fifth oil pressure switch 15 is provided in a low-and-reverse brake pressure oil passage 28 connecting the fifth hydraulic control valve 10 and the engagement piston chamber 5.

Each of the first to fifth oil pressure switches 11 to 15 outputs an ON signal when engagement pressure is supplied and outputs an OFF signal when engagement pressure is not supplied.

The electronic shift control system is comprised of an A/T control unit 40 to which signals from a vehicle speed sensor 41, a throttle sensor 42, an engine speed sensor 43, a turbine rotational speed sensor 44, an inhibitor switch 45, and an oil temperature sensor 46 are input. Signals from the oil pressure switches 11 to 15 are also input to the A/T control unit 40.

The A/T control unit 40 performs computations based on the above input signals and under a shift control rule, a fail-safe control rule, and so forth set in advance and outputs solenoid driving signals as engaging commands or disengaging commands according to the computation results to the first to fifth duty solenoids 6a to 10a.

In parallel with this, the A/T control unit 40 additionally makes a fail determination.

Upon determining that disengagement caused by failure has occurred, i.e. a friction element which should be engaged has been disengaged due to a malfunction of a valve or the like, or engagement caused by failure has occurred, i.e. a friction element which should be disengaged has been engaged due to a malfunction of a valve or the like, the A/T control unit 40 checks whether it is possible to identify one friction element which has failed. If it is impossible to identify one friction element, the A/T control unit 40 further checks whether or not shift to other gear positions can be realized. The A/T control unit 40 outputs a gear position command according to each checking result.

It should be noted that from the standpoint of the trouble that a desired gear ratio cannot be obtained in a designated gear position, disengagement caused by failure encompasses not only a case where power transmission becomes impossible, but also a case where a friction element is not completely engaged against an engaging instruction.

Figure 4:
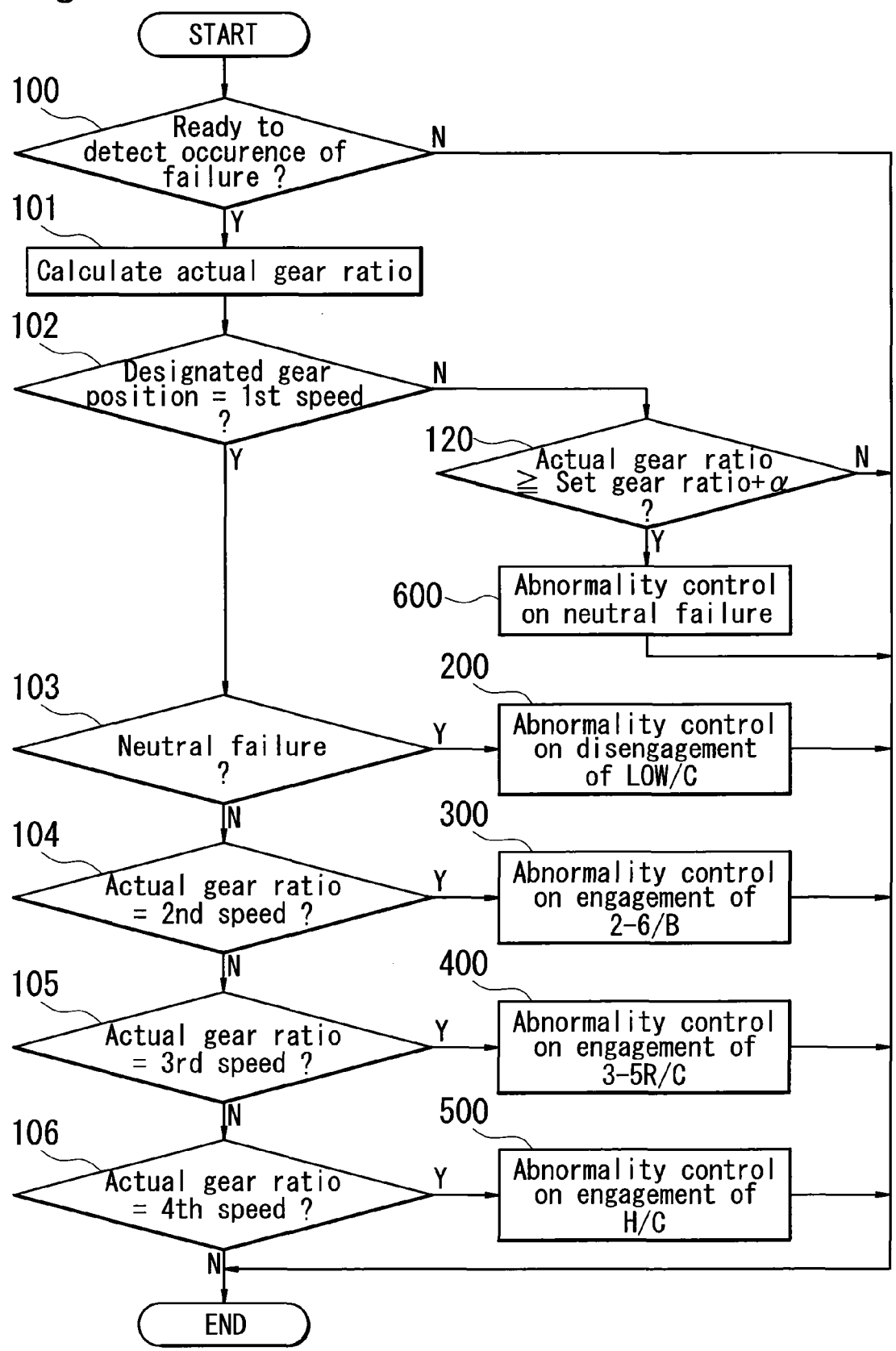
FIG. 4 is a flow chart showing the flow of control for carrying out failure determination and providing fail control.

A description will now be given of the flow of a process in which the A/T control unit 40 detects a failure of a friction element and provides suitable control. FIG. 4 is a main flow chart thereof.

First, in a step 100, the A/T control unit 40 checks whether it is ready to detect the occurrence of a failure of a friction element.

In this step, the A/T control unit 40 determines that it is ready to detect the occurrence of a failure of a friction element if the following conditions are satisfied: electric members of the electronic shift control system such as sensors, switches, solenoids, and so forth are normal, gear shifting is not underway (i.e. in the previous gear shifting, it has been determined that gear shifting had been completed), and the select lever is placed in any position other than P (parking), N (neutral), and R (reverse) ranges.

If the A/T control unit 40 is not ready to detect the occurrence of a failure of a friction element, the present process is terminated.

If the A/T control unit 40 is ready to detect the occurrence of a failure of a friction element, the process proceeds to a step 101 wherein the actual gear ratio is calculated. The actual gear ratio is found by reading signals from the vehicle speed sensor 41 and the turbine rotational speed sensor 44 and dividing the turbine rotational speed Nt by the vehicle speed Ns.

Next, in a step 102, it is checked whether or not a designated gear position is the first speed gear position. If the designated gear position is the first speed gear position, the process proceeds to a step 103, and if not, the process proceeds to a step 120.

In the step 103, it is checked whether or not a neutral failure has occurred. When the actual gear ratio is greater than a set gear ratio of the first speed gear position by a predetermined value or more, it is determined that a neutral failure has occurred. Specifically, when the output revolutions relative to the input revolutions on the engine side are less than predetermined revolutions, this means that power is not transmitted.

Patterns of failures likely to occur in the forward speed gear positions are illustrated in FIG. 5 based on the engagement table of FIG. 2. In FIG. 5, the circular mark indicates normal engagement, the square mark indicates engagement caused by failure, the triangular mark indicates disengagement caused by failure, and "x" indicates normal disengagement. It should be noted that a plurality of friction elements hardily fail at the same time, and it is assumed here that one of friction elements has failed.

As shown in FIG. 5, in the first speed gear position, the neutral (N) occurs when the low clutch LOW/C is disengaged by failure.

Thus, in the event of a neutral failure, it is determined that the low-clutch LOW/C has been disengaged by failure, and the process proceeds to a step 200 wherein control is carried out to cope with the abnormal disengagement of the low clutch LOW/C.

If, as a result of checking in the step 103, the neutral failure has not occurred, the process proceeds to a step 104 wherein it is checked whether or not the actual gear ratio corresponds to the second speed gear position.

As shown in FIG. 5, in the first speed gear position, the actual gear ratio corresponds to the second speed gear position when the 2-6 brake 2-6/B is engaged by failure.

Thus, when the actual gear ratio corresponds to the second speed gear position, it is determined that the 2-6 brake 2-6/B has been engaged by failure, and the process proceeds to a step 300 wherein control is carried out to cope with the abnormal engagement of the 2-6 brake 2-6/B.

If, as a result of checking in the step 104, the actual gear ratio does not correspond to the second speed gear position, the process proceeds to a step 105 wherein it is checked whether or not the actual gear ratio corresponds to the third speed gear position.

As shown in FIG. 5, in the first speed gear position, the actual gear ratio corresponds to the third speed gear position when the 3-5 reverse clutch 3-5R/C is engaged by failure.

Thus, when the actual gear ratio corresponds to the third speed gear position, it is determined that the 3-5 reverse clutch 3-5R/C has been engaged by failure, and the process proceeds to a step 400 wherein control is carried out to cope with the abnormal engagement of the 3-5 reverse clutch 3-5R/C.

If, as a result of checking in the step 105, the actual gear ratio does not correspond to the third speed gear position, the process proceeds to a step 106 wherein it is checked whether or not the actual gear ratio corresponds to the fourth speed gear position.

As shown in FIG. 5, in the first speed gear position, the actual gear ratio corresponds to the fourth speed gear position when the high clutch H/C is engaged due to failure.

Thus, when the actual gear ratio corresponds to the fourth speed gear position, it is determined that the high clutch H/C has been engaged by failure, and the process proceeds to a step 500 wherein control is carried out to cope with the abnormal engagement of the high clutch H/C.

If, as a result of checking in the step 106, the actual gear ratio does not correspond to the fourth speed gear position, it is determined that no friction element failure has occurred, and the process is terminated.

On the other hand, when the designated gear position is not the first speed gear position, it is checked in the step 120 whether or not the following equation is satisfied:

$$Nt/Ns => I+\alpha \quad (1)$$

(where I is a set gear ratio which should be achieved in the present gear position, and $\alpha$ is a predetermined value)

For example, when a failure occurs in the fourth speed gear position, shifting to the first speed gear position or neutral occurs as shown in combinations of engaged/disengaged friction elements in FIG. 5, and hence it appears that by checking the gear ratio, it is possible to detect a failure of the high clutch H/C if the gear ratio corresponds to the first speed gear position and to detect a failure of the low clutch LOW/C if the gear ratio corresponds to the neutral.

However, as the conventional problem described above, the first speed gear position is achieved by engagement of the low one-way clutch LOW/OWC, and hence the actual gear ratio cannot be settled at a value equal to or smaller than the gear ratio corresponding to the first speed gear position. Specifically, when a friction element is disengaged when the vehicle is moving at a high speed, whether the actual gear ratio corresponds to the first speed gear position or neutral cannot be determined until the engine speed increases to such an extent that the gear ratio corresponds to the first speed gear position. Mechanically, there may be cases where the engine speed cannot increase to a value corresponding to the gear ratio of the first speed gear position, and therefore accurate determination is difficult.

For this reason, when as a result of checking in the step 120 the actual gear ratio is greater than the gear ratio set for the designated gear position at the time of failure by a predetermined value or more and the above equation (1) is satisfied, it is merely determined that a neutral failure has occurred without identifying which friction element has failed, and the process then proceeds to a step 600.

In the step 600, control is carried out to cope with the neutral failure.

If, as a result of checking in the step 120, the above equation (1) is not satisfied, the present process is terminated.

Figure 6:
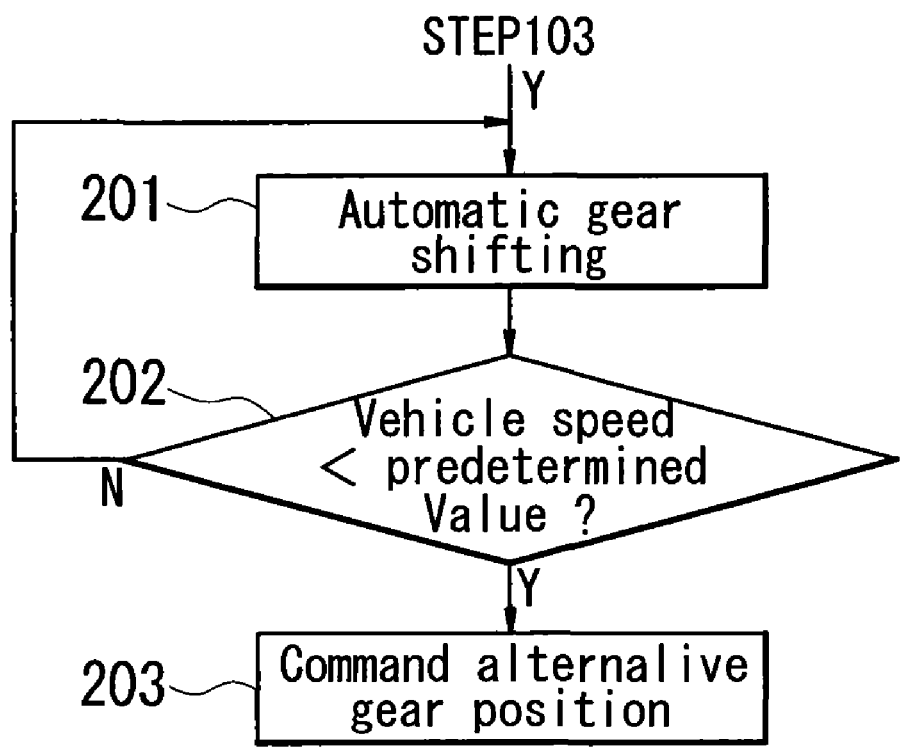
FIG. 6 is a flow chart showing in detail the flow of fail control.

FIG. 6 is a flow chart showing in detail the process in which control is carried out to cope with the abnormal disengagement of the low clutch in the step 200.

In a step 201, automatic gear shifting is carried out based on the vehicle speed and the throttle opening angle, while in a step 202, whether or not the vehicle has stopped is checked based on whether or not the vehicle speed has become lower than a predetermined value. That is, normal automatic gear shifting is continuously carried out until the vehicle stops.

It should be noted that automatic gear shifting is carried out on the gear position command level, and in actuality, even when a neutral failure has occurred due to disengagement caused by failure, the vehicle can be stopped by braking.

When the vehicle stops moving, the process proceeds to a step 203 wherein the fifth speed gear position of which gear ratio is the largest among gear positions which can be achieved without engaging the low clutch LOW/C is set as an alternative gear position. To this end, instructions for engaging the high clutch H/C and the 3-5 reverse clutch 3-5R/C are output.

Consequently, shifting to the fifth speed gear position which does not require engagement of the low clutch LOW/C disengaged due to failure is immediately accomplished to cause the vehicle to start moving again, and therefore racing of the engine can be prevented. Also, the vehicle can start moving with ease due to shifting to the fifth speed gear position which realizes the highest gear ratio and the highest starting torque among a plurality of gear position s which may be set as alternative gear positions.

Flow charts of the 2-6 brake abnormal engagement control process in the step 300, the 3-5 reverse clutch abnormal engagement control process in the step 400, and the high clutch abnormal engagement control process in the step 500 are omitted since they are identical with the low clutch abnormal engagement control process except in alternative gear positions to be selected.

In the 2-6 brake abnormal engagement control process in the step 300, the present state is maintained. Specifically, when the 2-6 brake is engaged due to failure, it is possible to shift to the second speed gear position, and hence the second speed gear position is set as an alternative gear position. As a result, the gear ratio can be large and the starting torque can be satisfactorily high, so that the vehicle can start moving again from a parked position.

Similarly, in the 3-5 reverse clutch abnormal engagement control process in the step 400, the present state is maintained.

Specifically, the third speed gear position which is achieved by engaging the 3-5 reverse clutch is set as an alternative gear position.

Similarly, in the high clutch abnormal engagement control process in the step 500, the present state is maintained. Specifically, the fourth speed gear position which is achieved by engaging the high clutch is set as an alternative gear position.

In either case, the vehicle can start moving in a relatively low speed gear position, and considerable starting torque can be obtained.

An alternative gear position can be determined merely by checking computation data, and racing of the engine can be prevented as distinct from the case where friction elements are sequentially checked according to a plurality of alternative gear position candidates.

The neutral failure control process in the step 600 is identical with the low clutch abnormal disengagement control process in the step 200 except in an alternative gear position to be selected, and hence a flow chart thereof is omitted.

An alternative gear position is set as described below.

In the case where a gear position (designated gear position) at the time of failure determination is the second, third, fifth, or sixth speed gear position, it is impossible to identify one friction element disengaged due to failure as is apparent from the failure patterns in FIG. 5, but there exists a gear position which can be achieved by engaging other friction elements without engaging a friction element which should be engaged in the gear position at the time of the occurrence of disengagement caused by failure. Accordingly, when disengagement caused by failure occurs in the second, third, fifth, or sixth speed gear position, a gear position which can be achieved by engaging other friction elements as mentioned above is designated as an alternative gear position.

Specifically, when a gear position at the time of occurrence of disengagement caused by failure is the second speed gear position (the low clutch LOW/C and the 2-6 brake 2-6/B are engaged), a fifth speed gear position command, i.e. an instruction for engaging the 3-5 reverse clutch 3-5R/C and the high clutch H/C is output, causing the vehicle to start moving again.

When a gear position at the time of occurrence of disengagement caused by failure is the third speed gear position (the low clutch LOW/C and the 3-5 reverse clutch 3-5R/C are engaged), a sixth speed gear position command, i.e. an instruction for engaging the high clutch H/C and the 2-6 brake 2-6/B is output.

When a gear position at the time of occurrence of disengagement caused by failure is the fifth speed gear position (the 3-5 reverse clutch 3-5R/C and the high clutch H/C are engaged), a second speed gear position command, i.e. an instruction for engaging the low clutch LOW/C and the 2-6 brake 2-6/B is output.

When a gear position at the time of occurrence of disengagement caused by failure is the sixth speed gear position (the high clutch H/C and the 2-6 brake 2-6/B are engaged), a third speed gear position command, i.e. an instruction for engaging the low clutch LOW/C and the 3-5 reverse clutch 3-5R/C is output.

As a result, shift to an alternative gear position which can be achieved without using a friction element disengaged due to failure can be accomplished immediately after the vehicle stops, and therefore the vehicle can start moving without racing of the engine.

As is apparent from the engagement table of FIG. 2, the fourth speed gear position is achieved by engaging the low clutch LOW/C and the high clutch H/C, and the first to sixth speed gear positions except for the fourth speed gear position cannot be achieved without engaging both of the low clutch LOW/C and the high clutch H/C of which has failed cannot be identified. Namely, the low clutch LOW/C has to be always engaged in the lower speed gear positions, the first to third speed gear positions, and the high clutch H/C has to be always engaged in the higher speed gear positions, the fourth to sixth speed gear positions.

That is, the fourth speed gear position is achieved by engaging friction elements any of which must be engaged so as to achieve other gear positions.

Thus, in the case where a gear position at the time of occurrence of disengagement caused by failure is the fourth speed gear position, the 3-5 reverse clutch 3-5R/C which can realize the third speed gear position and the fifth speed gear position in combination with each of the low clutch LOW/C and the high clutch H/C is selected in setting alternative gear positions in a step 603, and an instruction for engaging the 3-5 reverse clutch 3-5R/C with the low clutch LOW/C and the high clutch H/C at the same time is output. In other words, a command for setting the third speed gear position and the fifth speed gear position as alternative gear positions is output.

This instruction for engaging the low clutch LOW/C, the 3-5 reverse clutch 3-5R/C, and the high clutch H/C at the same time is intended to achieve one of the third speed gear position or the fifth speed gear position by engaging a normal one of the low clutch LOW/C and the high clutch H/C, one of which should have been disengaged due to failure, although the low clutch LOW/C, the 3-5 reverse clutch 3-5R/C, and the high clutch H/C would be interlocked if they are normal.

Thus, if the high clutch H/C is disengaged due to failure, the third speed gear position is achieved by engaging the low clutch LOW/C and the 3-5 reverse clutch 3-5R/C immediately after the vehicle stops. If the low clutch LOW/C is disengaged due to failure, the fifth speed gear position is achieved by engaging the high clutch H/C and the 3-5 reverse clutch 3-5R/C immediately after the vehicle stops.

As a result, the vehicle can start moving without racing of the engine caused by a control delay in the case where the third speed gear position and the fifth speed gear position are sequentially achieved by engagement of the low clutch LOW/C and the 3-5 reverse clutch 3-5R/C and engagement of the high clutch H/C and the 3-5 reverse clutch 3-5R/C, respectively.

FIG. 7 is a diagram showing patterns of engaging instructions output by the above described abnormality control after the vehicle stops. In FIG. 7, the circular mark indicates engagement instruction, and "x" indicates disengagement instruction.

The step 101 in the flow chart of FIG. 4 constitutes an actual gear ratio calculating means of the invention, the steps 102 to 106 and 120 constitute a failure determining means of the invention, and the steps 200, 300, 400, 500, and 600 constitute an abnormality control means of the invention.

The low clutch LOW/C and the low one-way clutch LOW/OWC correspond to one frictional element and a one-way clutch, respectively, of the invention, and the first speed gear position corresponds to a gear position which is achieved by one friction element and a one-way clutch.

Also, an alternative gear position corresponds to a power transmissible gear position.

According to the present invention described above, the set gear ratio I of a designated gear position at the time of failure and the actual gear ratio Nt/Ns are compared with each other to determine whether or not any friction element has failed, and an alternative gear position is designated as a power transmissible gear position based on the determination result. In particular, only when a designated gear position is the first speed gear position which is achieved by engagement of one low clutch LOW/C and the one-way clutch, one friction element which has failed is identified, and hence it is possible to determine the details of failure with accuracy and properly set an alternative gear position. On the other hand, when a designated gear position at the time of failure is not the first speed gear position, one friction element which has failed is not identified, and hence it is possible to quickly set an alternative gear position without the possibility of erroneous determination.

Specifically, when it is determined that the 2-6 brake 2-6/B, the 3-5 reverse clutch 3-5R/C, or the high clutch HC remains engaged against a disengaging instruction by comparing the set gear ratio and the actual gear ratio in the case where a designated gear position is the first speed gear position, any of the second speed gear position, third speed gear position, and fourth speed gear position which are achieved by engaging the low clutch LOW/C and the friction element remaining engaged against the disengaging instruction is designated as an alternative gear position, so that power can be reliably transmitted.

It should be noted that when it is determined that the low clutch LOW/C remains unengaged against an engaging instruction in the case where a designated gear position is the first speed gear position, the fifth speed gear position which is achieved by engaging friction elements other than the low clutch LOW/C is set as an alternative gear position, so that power can be transmitted.

In the case where a designated gear position is other than the first speed gear position, it is assumed that any of a plurality of friction elements which should be engaged remains unengaged due to failure. In this case, which friction element has been unengaged due to failure is not specifically identified, but another gear position which is achieved by engaging friction elements other than the friction elements which should be engaged in the designated gear position is set as an alternative gear position. That is, comparison in which it may be difficult to determine which gear position corresponds to the actual gear ratio depending on the driving conditions can be avoided, and therefore it is possible to quickly set an alternative gear position without the possibility of erroneous determination.

Further, when it is determined that any friction element has failed in the fourth speed gear position which is achieved by engaging the low clutch LOW/C and the high clutch H/C, one of which must be engaged so as to achieve other gear positions, the third speed gear position command and the fifth speed gear position command each corresponding to a combination of a friction element which should be engaged in the fourth speed gear position and another friction element which should be unengaged in the fourth speed gear position are output at the same time. As a result, one of the third speed gear position and the fifth speed gear position each of which is achieved by engaging a friction element which has not been disengaged due to failure among friction elements which should be engaged in a gear position at the time of failure and another friction element as mentioned above is immediately achieved, and therefore racing of the engine can be prevented as distinct from the case where a plurality of gear positions are sequentially re-designated.

Further, a new command indicative of an alternative gear position which can be achieved without engaging a friction element disengaged due to failure is output after the vehicle stops, and hence it is possible to prevent sudden braking caused by downshift to the second speed gear position as a low speed gear position while the vehicle is moving in, for example, the fifth speed gear position in which disengagement caused by failure has occurred.

Although in the above described embodiment, when the actual gear ratio is greater than the set gear ratio of a gear position at the time of failure by a predetermined value, it is determined that disengagement caused by failure has occurred, this is only illustrative, but other various means can be adopted to detect disengagement caused by failure.

Also, although in the above described embodiment, the present invention is applied to the automatic transmission with the gear trains illustrated in FIG. 1, the present invention may be applied to automatic transmissions with other various types of gear trains. Also, although in the above described embodiment, the fail control for a plurality of forward speed gear positions has been described, the present invention may be applied to an automatic transmission with a plurality of reverse speed gear positions.

What is claimed is:

1. A fail control apparatus for an automatic transmission which realizes a plurality of gear positions by engaging friction elements in combination, comprising:
   actual gear ratio calculating means for calculating a present actual gear ratio;
   fail determining means for comparing a set gear ratio of a present designated gear position and the actual gear ratio to determine whether a friction element has failed; and
   abnormality control means responsive to occurrence of failure of a friction element, for designating a power transmissible gear position,
   wherein said fail determining means identifies one friction element having failed only when the designated gear position is a gear position that is achieved by engaging the one friction element and a one-way clutch, and
   said abnormality control means designates the power transmissible gear position based on the identified friction element.

2. A fail control apparatus for an automatic transmission according to claim 1, wherein, when said fail determining means determines that the one friction element remains unengaged against an engaging instruction in the designated gear position that is achieved by engaging the one friction element and the one-way clutch, said abnormality control means designates a gear position that is achieved by engaging friction elements other than the one friction element as the power transmissible gear position.

3. A fail control apparatus for an automatic transmission according to claim 1, wherein, in the designated gear position that is achieved by engaging the one friction element and the one-way clutch, when said fail determining means determines that a friction element other than the one friction element to be engaged in the designated gear position remains engaged against a disengaging instruction, said abnormality control means designates a gear position that is achieved by engaging the one friction element and the friction element remaining engaged against the disengaging instruction as the power transmissible gear position.

4. A fail control apparatus for an automatic transmission according to claim 1, wherein, when said fail determining means determines that there is any friction element remaining unengaged against an engaging instruction in a designated gear position other than a gear position that is achieved by engaging the one friction element and the one-way clutch, said abnormality control means designates other gear position that is achieved by engaging friction elements other than friction elements which should be engaged in the designated gear position as the power transmissible gear position.

5. A fail control apparatus for an automatic transmission according to claim 1, wherein
the designated gear position is a predetermined gear position that is achieved by engaging friction elements any one of which must be engaged so as to achieve other gear positions,
when said fail determining means determines that there is any friction element remaining unengaged against an engaging instruction, said abnormality control means outputs a plurality of gear position commands corresponding to combinations of the friction elements which should be engaged in the designated gear position and other friction elements which should be unengaged in the designated gear position at the same time,
so that a gear position that is achieved by a combination of an engaged friction element among the friction elements which should be engaged in the designated gear position at the time of failure and the other friction element is achieved as the power transmissible gear position.

6. A fail control apparatus for an automatic transmission according to claim 1, wherein the automatic transmission is mounted in a vehicle, and said abnormality control means outputs a gear position command after the vehicle stops moving.

7. A fail control apparatus for an automatic transmission according to claim 2, wherein the automatic transmission is mounted in a vehicle, and said abnormality control means outputs a gear position command after the vehicle stops moving.

8. A fail control apparatus for an automatic transmission according to claim 3, wherein the automatic transmission is mounted in a vehicle, and said abnormality control means outputs a gear position command after the vehicle stops moving.

9. A fail control apparatus for an automatic transmission according to claim 4, wherein the automatic transmission is mounted in a vehicle, and said abnormality control means outputs a gear position command after the vehicle stops moving.

10. A fail control apparatus for an automatic transmission according to claim 5, wherein the automatic transmission is mounted in a vehicle, and said abnormality control means outputs the gear position commands after the vehicle stops moving.

* * * * *